(12) United States Patent
Chen et al.

(10) Patent No.: US 8,904,381 B2
(45) Date of Patent: Dec. 2, 2014

(54) USER DEFINED DATA PARTITIONING (UDP)—GROUPING OF DATA BASED ON COMPUTATION MODEL

(75) Inventors: Qiming Chen, Cupertino, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1579 days.

(21) Appl. No.: 12/358,995

(22) Filed: Jan. 23, 2009

(65) Prior Publication Data

US 2010/0192148 A1 Jul. 29, 2010

(51) Int. Cl.
*G06F 17/30* (2006.01)
*G06F 9/50* (2006.01)

(52) U.S. Cl.
CPC ........ *G06F 17/30339* (2013.01); *G06F 9/5066* (2013.01); *G06F 17/30584* (2013.01); *Y10S 707/968* (2013.01)
USPC .............................................. 718/1; 707/968

(58) Field of Classification Search
CPC .................................. G06F 17/30584
USPC .............................................. 718/1; 707/968
See application file for complete search history.

(56) References Cited

U.S. PATENT DOCUMENTS

| | | | |
|---|---|---|---|
| 5,878,409 A * | 3/1999 | Baru et al. .............................. 1/1 |
| 6,341,289 B1 * | 1/2002 | Burroughs et al. ........... 707/737 |
| 7,406,522 B2 * | 7/2008 | Riddle .......................... 709/226 |
| 7,577,637 B2 * | 8/2009 | Ghosh ................................... 1/1 |
| 7,788,646 B2 * | 8/2010 | Ward ............................. 717/132 |
| 2004/0199526 A1 * | 10/2004 | Nishikawa et al. ........... 707/100 |
| 2005/0050085 A1 * | 3/2005 | Shimada et al. .............. 707/102 |
| 2005/0268298 A1 * | 12/2005 | Hunt et al. ........................ 718/1 |
| 2007/0067261 A1 * | 3/2007 | Burger et al. ..................... 707/2 |
| 2008/0092112 A1 * | 4/2008 | Jin et al. .......................... 717/106 |
| 2008/0189239 A1 * | 8/2008 | Bawa et al. ....................... 707/2 |
| 2008/0263312 A1 * | 10/2008 | Sater et al. ..................... 711/173 |

\* cited by examiner

*Primary Examiner* — Robert Fennema

(57) ABSTRACT

Methods, systems, and computer program products are provided for generating application-aware data partitioning to support parallel computing. A label for a user defined data partitioning (UDP) key is generated by a labeling process to configure data partitions of original data. The UDP is labeled by the labeling process to include at least one key property excluded from the original data. The data partitions are evenly distributed to co-locate and balance the data partitions and corresponding computations performed by computational servers. A data record of the data partitions is retrieved by performing an all-node parallel search of the computational servers using the UDP key.

12 Claims, 8 Drawing Sheets

500

LABEL A USER DEFINED DATA PARTITIONING (UDP) KEY TO CONFIGURE DATA PARTITIONS OF ORIGINAL DATA, THE UDP BEING LABELED TO INCLUDE AT LEAST ONE KEY PROPERTY EXCLUDED FROM THE ORIGINAL DATA 510

ALLOCATE THE DATA PARTITIONS TO CO-LOCATE THE DATA PARTITIONS AND CORRESPONDING COMPUTATIONAL SERVERS 520

RETRIEVE A DATA RECORD OF THE DATA PARTITIONS BY PERFORMING AN ALL-NODE PARALLEL SEARCH OF THE COMPUTATIONAL SERVERS USING THE UDP KEY 530

USER DEFINED DATA PARTITIONING (UDP)—GROUPING OF DATA BASED ON COMPUTATION MODEL

BACKGROUND OF THE INVENTION

A trend in supporting large scale information technology (IT) applications is converging data intensive computation and data management to achieve fast data access and reduced data flow. For example, dynamic data warehousing and operational business intelligence (BI) applications involve large-scale data intensive computations in multiple stages from information extraction, modeling, and analysis to prediction. To support such applications, two IT disciplines are often deployed: high performance computing (HPC) and scalable data warehousing, both of which are based on the use of computer cluster technology and partitioning of tasks and data for parallel processing. In such an environment, improper partitioning of data over computer cluster nodes often causes a mismatch in converging computation and data.

BRIEF DESCRIPTION OF THE DRAWINGS

Embodiments of the invention relating to both structure and method of operation may best be understood by referring to the following description and accompanying drawings.

DETAILED DESCRIPTION

Figure 1A:
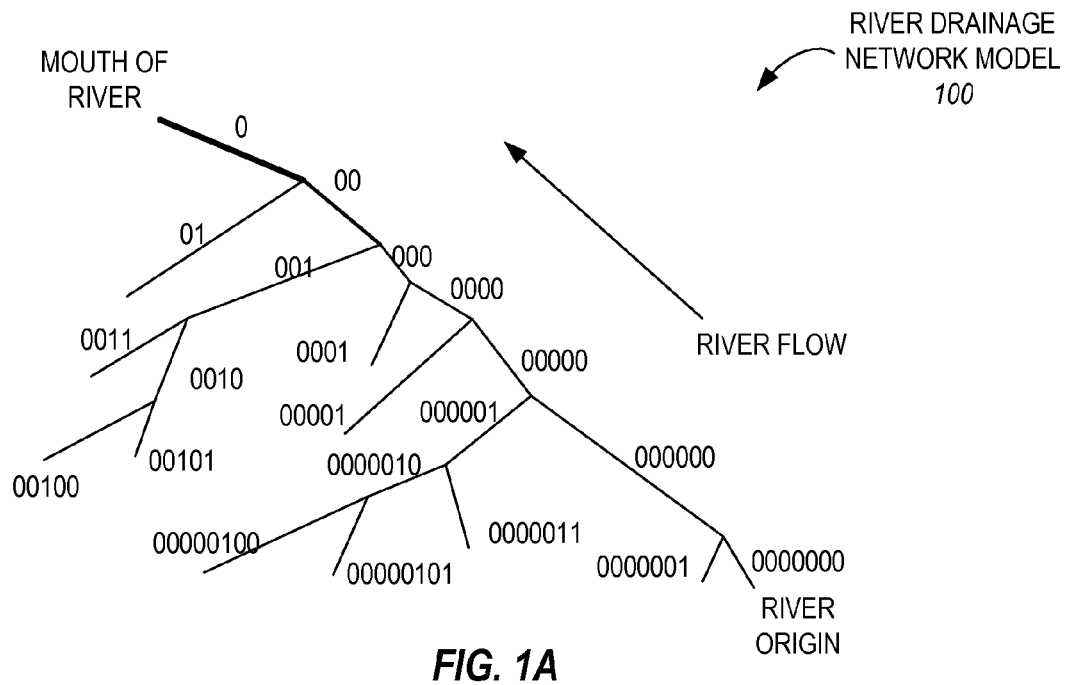
FIG. 1A illustrates a river drainage network model, according to an embodiment.

Novel features believed characteristic of the present disclosure are set forth in the appended claims. The disclosure itself, however, as well as a preferred mode of use, will best be understood by reference to the following detailed description of illustrative embodiments when read in conjunction with the accompanying drawings. The functionality of various modules, devices or components described herein may be implemented as hardware (including discrete components, integrated circuits and systems-on-a-chip 'SoC'), firmware (including application specific integrated circuits and programmable chips) and/or software or a combination thereof, depending on the application requirements. The accompanying drawings may not to be drawn to scale and some features of embodiments shown and described herein may be simplified or exaggerated for illustrating the principles, features, and advantages of the disclosure.

The following terminology may be useful in understanding the present disclosure. It is to be understood that the terminology described herein is for the purpose of description and should not be regarded as limiting.

System—One or more interdependent elements, components, modules, or devices that co-operate to perform one or more functions.

Configuration—Describes a set up of elements, components, modules, devices, and/or a system, and refers to a process for setting, defining, or selecting hardware and/or software properties, parameters, or attributes associated with the elements, components, modules, devices, and/or the system. For example, a cluster of servers may be configured to include $2**N$ servers, N being an integer.

Architecture—A basic infrastructure designed to provide one or more functions. An architecture used in an information technology (IT) environment may include electronic hardware, software, and services building blocks (used as platform devices) that are designed to work with each other to deliver core functions and extensible functions. The core functions are typically a portion of the architecture that may selectable but not modifiable by a user. The extensible functions are typically a portion of the architecture that has been explicitly designed to be customized and extended by the user as a part of the implementation process.

Model—A model can be a representation of the characteristics and behavior of a system, element, solution, application, or service. A model as described herein captures the design of a particular IT system, element, solution, application, or service. The model can include a declarative specification of the structural, functional, non-functional, and runtime characteristics of the IT system, element, solution, application, or service. The instantiation of a model creates a model instance.

Considerations in Parallel Processing

Applicants recognize that while both parallel computing and parallel data management have made significant progress with advances in cluster technology, they are often treated separately. For scientific and other computing applications, data are stored in separate repositories and brought in for computation. For databases, applications are viewed as external clients. Very often, a task and the data to be applied by it are not co-located, causing significant overhead of data flow. Such locality mismatch is often the cause of poor performance and is considered as a major performance bottleneck. The traditional hash, range and list partitioning mechanisms do not address the co-location issue as they focus on general-purpose parallel data access but without taking into account the application-level semantics. The traditional methods map rows of a table to partitions based on existing partition key values presented in the original data. Thus, if the data grouping and partitioning needs to be driven by certain application-level concept not presented in the original data, then there would be no appropriate partition keys that may be used, thereby making "moving computation to data" a challenge.

Applicants further recognize that some "flat" parallel computing architectures, characterized by applying one function to multiple data objects, do not catch the order dependency of data processing. For data intensive computation, it would be desirable for the data partitioning technique to catch such dependencies.

Embodiments of systems and methods for partitioning of data based on a computation model are disclosed herein that enable convergence of data intensive computation and data management for improved performance and reduced data flow. In a combined cluster platform, co-locating computation and data is desirable for efficiency and scalability. Therefore, it is desirable to partition data in a manner that is consistent with the computation model. The systems and methods disclosed herein provide a user defined data partitioning (UDP) key for making application-aware data partitioning of original data.

Moving data is often more expensive and inefficient than moving programs, thus it is desirable that computation be data-driven. The goal of co-locating computation and supporting data may be achieved if data partitioning of the original data and allocation of the data partitions to the computational resources are both driven by a computation model representing an application. A hydrologic application is described that uses the UDP key for data partitioning based on the computational model for the application. Based on hydrologic fundamentals, a watershed computation is made region by region from upstream to downstream in a river drainage network. Therefore, the original data for the hydrologic application is to be partitioned in accordance to the computational model for computation efficiency.

The UDP enables grouping of data based on the semantics at the data intensive computing level. This allows data partitioning to be consistent with the data access scoping of the computation model, which underlies the co-location of data partitions and task executions. Unlike the conventional hash or range partitioning method which maps rows of a table to partitions based on the existing partition key values, with UDP, the partition keys are generated or learnt from the original data by a labeling process based on the application level semantics and computation model, representing certain high-level concepts. Further, unlike the conventional data partitioning that is primarily used to support flat parallel computing, e.g., applying a function to independent data objects, the UDP partitions data by taking into account the control flow in parallel computing based on a data dependency graph. Thus, the UDP methodology supports computation-model aware data partitioning, for tightly incorporating parallel data management with data intensive computation while accommodating the order dependency in multi-step parallel data processing.

The disclosure includes a section outlining an application involving watershed computation performed by a river drainage network, a section describing additional details of user defined data partitioning (UDP), and a section to describe implementation considerations.

Watershed Computation Performed by a River Drainage Network

Figure 1B:
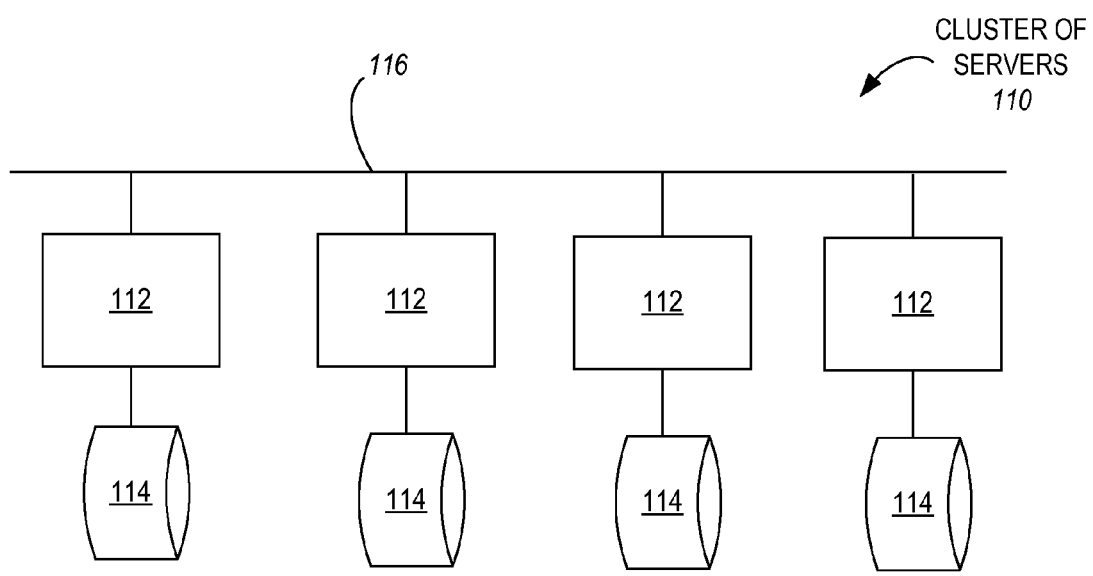
FIG. 1B illustrates a cluster of servers to implement a river drainage network model described with reference to FIG. 1A, according to an embodiment.

FIG. 1A illustrates a river drainage network model 100, according to an embodiment. FIG. 1B illustrates a cluster of servers 110 to implement the river drainage network model 100 described with reference to FIG. 1A, according to an embodiment. Referring to FIGS. 1A and 1B, the river drainage network model 100 is a hydro-informatics system (HIS) that includes one or more servers 112 (also referred to as computational devices or computational servers) coupled by a communication network 116 to carry out a class of space-time oriented data intensive hydrologic computations that are performed periodically or on demand with near-real-time response (e.g., responsive in a time frame that is soon enough to take a corrective action). The HIS, like many other earth information systems, may be implemented as a cluster technology based HPC system. Additional details of the implementation aspects of a cluster technology based HPC system architecture is described with reference to FIG. 6.

Referring back to FIGS. 1A and 1B, the river drainage network model 100 collects data (such as rainfall, water level, flow rate, discharge volume, and others) from various inputs. The data, which may be stored in a database 114, is referred to as the original data. Computation results, which may utilize the data, may be stored in the same underlying databases to be retrieved for analysis, mash-up and visualization. The locality match of parallel computing and parallel data management is desirable to improve the efficiency of such data intensive computation.

The majority of data stored in the river drainage network model 100 are location sensitive geographic information. The river drainage network model 100 may be illustrated as an unbalanced binary tree, where river segments are named by binary string codification. For example, starting downstream at a mouth of a river is binary segment 0 and ending upstream at an origin of the river is binary segment 0000000, thereby indicating there are 7 river segments between the mouth of the river and the origin of the river. A tributary nearest to the mouth of the river is shown as binary segment 01.

Data describing the river segments binary tree may be stored in a table, where each row represents a river segment, or a tree node. For example, a table storing the binary tree representing the river drainage network model 100 includes 21 rows for the 21 binary segments. It is understood that the number of river segments may vary depending on each application. Among other data, the table may include attributes such as node_id, left_child_id, right_child_id, node_type (e.g., RR if it is the root of a region; or RN otherwise), and a region_id that is generated as the UDP key.

Figure 2A:
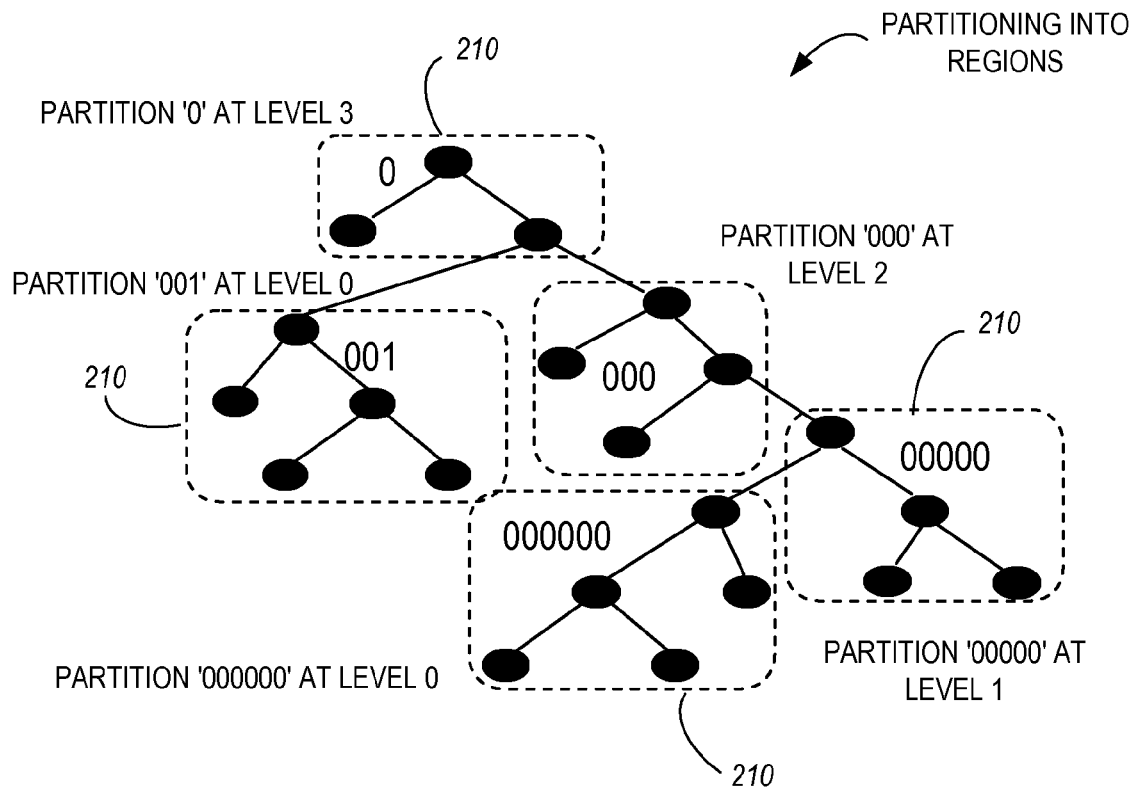
FIG. 2A illustrates a partitioning of river segments into regions, the river segments being included in a river drainage network model described with reference to FIG. 1A, according to an embodiment.

FIG. 2A illustrates a partitioning of river segments included in the river drainage network model 100 into regions, according to an embodiment. In a watershed computation application the river segments may be grouped or partitioned into regions 210 and may be processed in an order from upstream regions to downstream regions. The twenty-one (21) river segments shown in the river drainage network model 100 may be partitioned into 5 regions 210. It is understood that the number of river segments and the number of regions may vary depending on each application. Regions 210 also form a tree but not necessarily a binary tree. Each region is represented by a node in the region tree, and viewed as a partition of the river segments tree. A region has the following properties (amongst others):

region_id, that takes the value of the root node_id;

region_level, as the length of its longest descendant path counted by region, bottom-up from the leaves of the region tree; and parent_region_id, the region_id of the parent region.

The concept of defining or configuring a region is driven by the computational needs defined by the application and the model (is application-aware and is consistent with the computational model) and the desire to co-locate data and computation to reduce data flow. The formation of a region is not an original property or attribute of river segments. That is, the original data associated with the river drainage network model 100 excludes the region as one of its property or attribute. Specifically, the formation or configuration of a region represents the results of a data labeling process and the generated region_id instances from that labeling process serve as the user defined data partitioning (UDP) keys of the river segments table. Additional details of the UDP key are described with reference to FIGS. 3A, 3B, and 3C.

Referring back to FIG. 2A, the river-segment table is partitioned by region across multiple server nodes 112 to be accessed in parallel. In a watershed computation, the same function may be applied, in a desired order, to multiple data partitions corresponding to the geographic regions. For example, computations being performed on a region need to retrieve the updated information of the root nodes of its child regions. The results of local executions are communicated through database access, using either permanent tables or temporary tables.

Figure 2B:
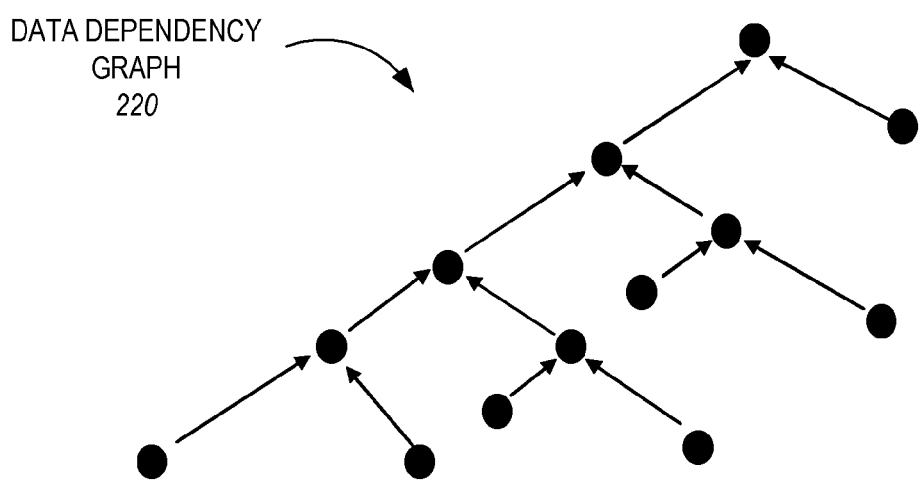
FIG. 2B illustrates a data dependency graph for defining an order of processing data partitions, according to an embodiment.

FIG. 2B illustrates a data dependency graph 220 for defining an order of processing data partitions, according to an embodiment. In the river drainage application, watershed computations are made in a desired sequence as indicated by the data dependency graph 220, region-by-region, from upstream to downstream. Thus, from a computational viewpoint the region tree is post-order traversed, the root being computed last. The desired order in performing computation is described as the 'data dependency graph' 220 based parallel processing since geographically dependent regions 210 are desired to be processed in certain order, but the parallel processing opportunities exist for the regions 210 which can be computed in any order. For instance, regions 210 at different tree branches may be processed in parallel. The data partitioning is performed in a manner that is consistent with the data dependency graph.

Figure 3A:
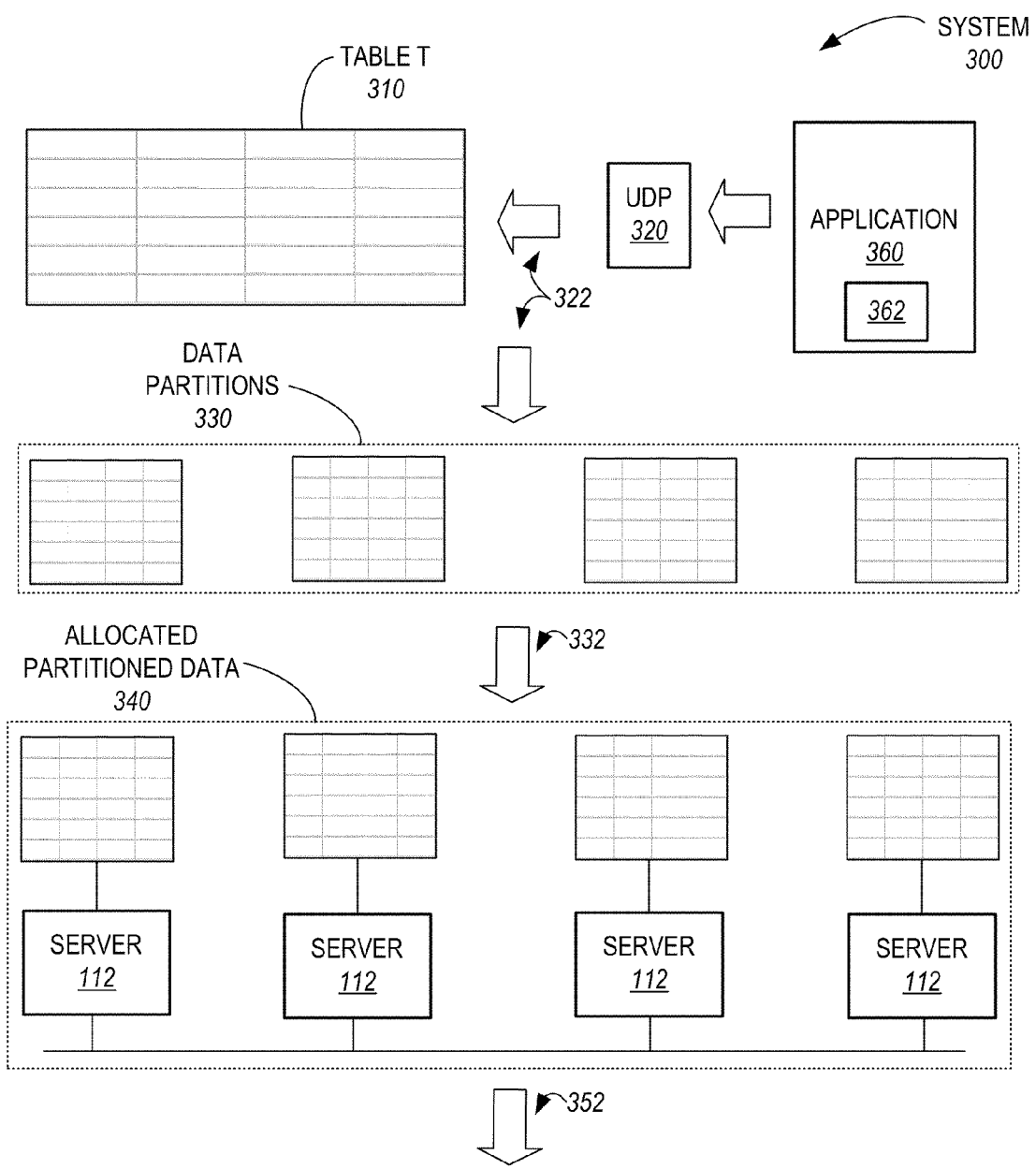
FIG. 3A illustrates a block diagram of a UDP based parallel processing system, according to an embodiment.

FIG. 3A illustrates a block diagram of a UDP based parallel processing system 300, according to an embodiment. The parallel processing system 300 includes a table T 310 that includes at least a portion of the original data that may be parallel processed, a UDP key 320 used to partition data included in the table T 310, data partitions 330, and allocated partitioned data 340. The processing system 300 supports the processing of a query to retrieve one or more data records stored in the allocated partitioned data 340. As described earlier, the UDP key 320 that includes at least one key property excluded from the original data (e.g., a region described with reference to the river drainage network model 100) is generated or learnt from the original data based on an application 360, including application level semantics and a computation model representing the application.

A UDP key for partitioning a table T 310 (that includes at least a portion of the original data) includes the following processes:

a labeling process 322 to mark rows of T 310 for representing their group memberships, e.g., to generate partition keys for data partitioning;

an allocating (or distributing or partitioning) process 332 to distribute data groups (or partitions) to corresponding nodes of the cluster of servers 110; and a retrieving process 352 for accessing data records of an already partitioned table, e.g., allocated partitioned data 340.

The processes for labeling 322, allocating 332 and retrieving 352 are often data model oriented and are described using the river drainage tree model and the corresponding watershed computation as a reference. As watershed computation is applied to river segments regions 210 from upstream to downstream, the river segments are grouped into regions 210 and allocated them over multiple databases. A region contains a binary tree of river segments. The regions 210 themselves also form a tree but not necessarily a binary tree. The partitioning is also made bottom-up from upstream (child) to downstream (parent) of the river, to be consistent with the geographic dependency of hydrologic computation.

The river segments tree is partitioned based on the following criterion. Counted bottom-up in the river segments tree, every sub-tree of a given height forms a region, which is counted from either leaf nodes or the root nodes of its child regions. In order to capture the geographic dependency between regions, the notion of region level is introduced as the partition level of a region that is counted bottom-up from its farthest leaf region, thus represents the length of its longest descendant path on the region tree. As described with reference to FIGS. 2A and 2B, the levels between a pair of parent/child regions may not be consecutive. The computation independence (e.g, parallelizability) of the regions at the same level is statically assured.

Labeling 322 aims at grouping the nodes of the river segments tree into regions 210 and then assigning a region_id to each tree node. Labeling 322 is made bottom-up from leaves. Each region spans k levels in the river-segment tree, where k is referred to as partition_depth, and for a region, counted from either leaf nodes river segments tree or the root nodes of its child regions. The top-level region may span the remainder levels smaller than k. Other variables are explained below.

The depth of a node is its distance from the root; the depth of a binary tree is the depth of its deepest node; the height of a node is defined as the depth of the binary tree rooted by this node. The height of a leaf node is 0.

The node_type of a node is assigned to either RR or RN after its group is determined during the labeling process. This variable also indicates whether a node is already labeled or not.

CRR is used to abbreviate the Closest RR nodes beneath a node t where each of these RR nodes can be identified by checking the parent_region_id value of the region it roots, as either the region_id of t, or un-assigned yet. Correspondently, the Closest Descendant Regions beneath a node may be abbreviated as its CDR.

The following functions on a tree node, t, are defined.

is-root( ) returns True if t is the root of the whole binary tree.

cdr( ) returns the CDR regions beneath t.

adj-height( ) returns 0 if the node type of t is RR, otherwise as the height of the binary tree beneath t where all the CRR nodes, and the sub-trees beneath them, are ignored.

adj-desc( ) returns the list of descendant nodes of t where all the CRR nodes, and the sub-trees beneath them, are exclusive.

max-cdr-level( ) returns the maximal region_level value of t's CRR (or CDR).

A labeling algorithm 362 generates region_id for each tree node as its label, or partition key (the UDP key 320 may be generated automatically by executing the labeling algorithm 362 or the UDP key 320 may be generated manually); as well as the information about partitioned regions, including the id, level, parent region for each region. The labeling algorithm 362 (configured to be in accordance with a computational model) to generate the UDP key 320 is outlined below:

| Algorithm PostorderTreeNodeLabeling (bt, k) |
| --- |
| Input: (1) BinaryTree bt |
| (2) int k as partition depth |
| Output: (1) region_id of each node (label) |
| (2) id, level, parent of each region |
| Procedure |
| 1: if bt = ø then |
| 2:    return |
| 3: if bt.node_type ≠ UNDEF then |
| 4:    return |

-continued

Algorithm PostorderTreeNodeLabeling (bt, k)

```
 5: if bt.left_child ≠ ø && bt.left_child.adj-height( ) ≥ k then
 6:     PostorderTreeNodeLabeling (bt.left_child)
 7: if bt.right_child≠ø && bt.right_child.adj-height( ) ≥ k then
 8:     PostorderTreeNodeLabelping (bt.right_child)
 9: if bt.is_root( ) || bt.adj-height( ) = k then
10:     Region p = new Region(bt.node_id)
11:     bt.region_id = p.get-id( ) // optionally as bt.node_id
12:     bt.region_level = bt.max-cdr-level( ) + 1
13:     bt.node_type = RR
14:     List cdr = bt.cdr( )
15:     for each ncdr in cdr do
16:         ncdr.parent_region_id = bt.region_id
17:     List members = bt.adj-desc( )
18:     for each nm in members do
19:         nm.region_id = bt.region_id
20:         nm.node_type = RN.
```

Figure 3B:
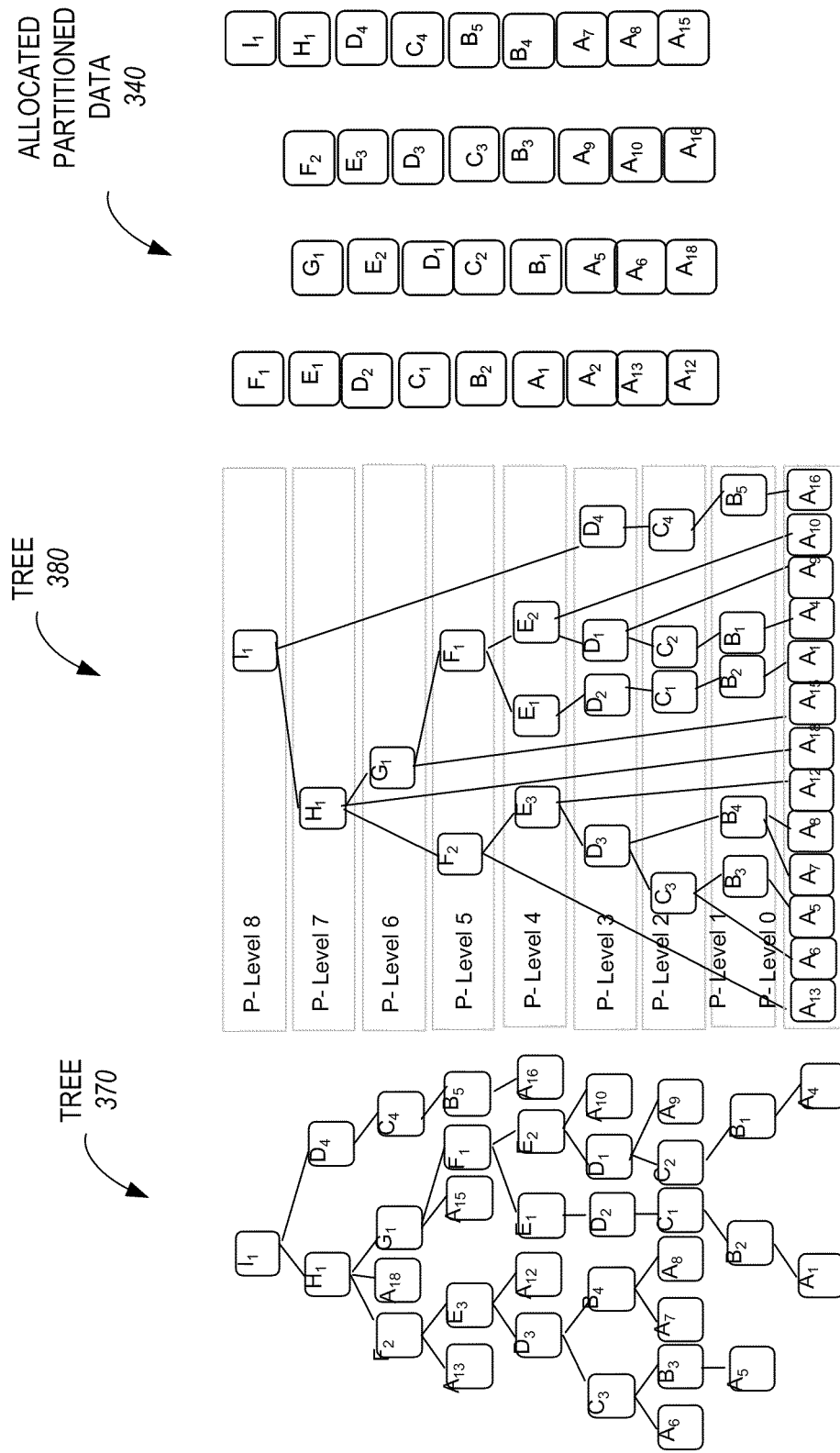
FIG. 3B illustrates a region tree with region levels in data partitioning, according to an embodiment.

FIG. 3B illustrates a region tree with region levels in data partitioning, according to an embodiment. After labeling 322, the river segments (included in T 310) are partitioned into data partitions 330 corresponding to the regions 210. Regions 210 form a tree 370. Counted from the leaves of the region tree and in the bottom-up order, each region has a region-level as its longest path. A tree 380 is illustrated having 9 levels (level 0 through level 8). A processing load is balanced by evenly distributing the data partitions 330 to each server 112 as allocated partitioned data 340.

The allocation process 332 addresses how to map the data partitions 330 (labeled river regions) to multiple databases and corresponding server nodes 112. As the river regions at the same region level have no geographic dependency they can be processed in parallel. The allocation may proceed in a conservative manner to distribute regions 210, using the following process:

Process 1: generate region-hash from region_id;

Process 2: map the region-hash values to the keys of a mapping table that is independent of the cluster configuration; then distribute regions to server-nodes based on that mapping table. The separation of logical partition and physical allocation makes the data partitioning independent of the underlying infrastructure.

Process 3: balance load, e.g., maximally evening the number of regions over the server nodes level by level in the bottom-up order along the region hierarchy.

Process 4: record the distribution of regions and make it visible to all server nodes.

Note that the focus is on static data allocation for all applications, rather than static task partitioning for one particular application.

Figure 3C:
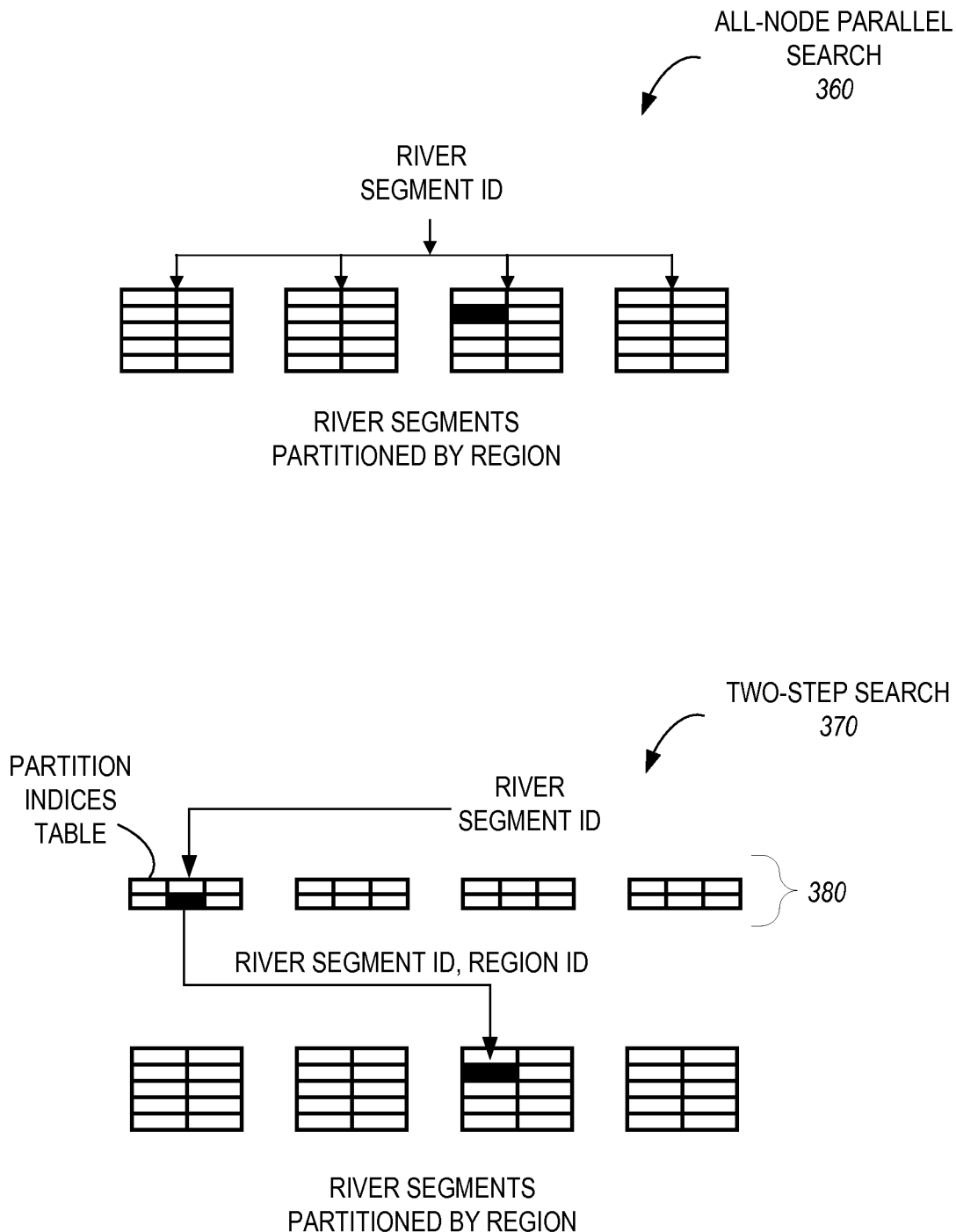
FIG. 3C illustrates parallel access of allocated partitioned data, according to an embodiment.

FIG. 3C illustrates parallel access of allocated partitioned data, according to an embodiment. After data partitioning 330, allocated partitioned data 340 is generated. To locate the region of a river segment given in a query received can be very different from searching the usual hash partitioned or range partitioned data, in case the partition keys are generated through labeling but not given in the "unlabeled" query inputs. The general mechanism is based on "ALL-NODES" parallel search 360 shown in FIG. 3C.

Another technique creates 'partition indices' 380, e.g., to have region_ids indexed by river segment_ids and to hash partition the indices. In this technique, the full records of river segments are partitioned by region, and in addition, the river segment_ids for indexing regions are partitioned by hash. Then querying a river segment given its id but without region (e.g., without the UDP key 320), is a two step search 370 as shown in FIG. 3C: first, based on the hash value of the river segment id, only one node is identified for indexing its region, and second, based on the hash value of the region, the node containing the full record of the river segment is identified for data retrieval. As the full record size of a river segment may be very large, a storage overhead of preparing 'partition indices' is relatively small.

Generalized UDP Development

Figure 4:
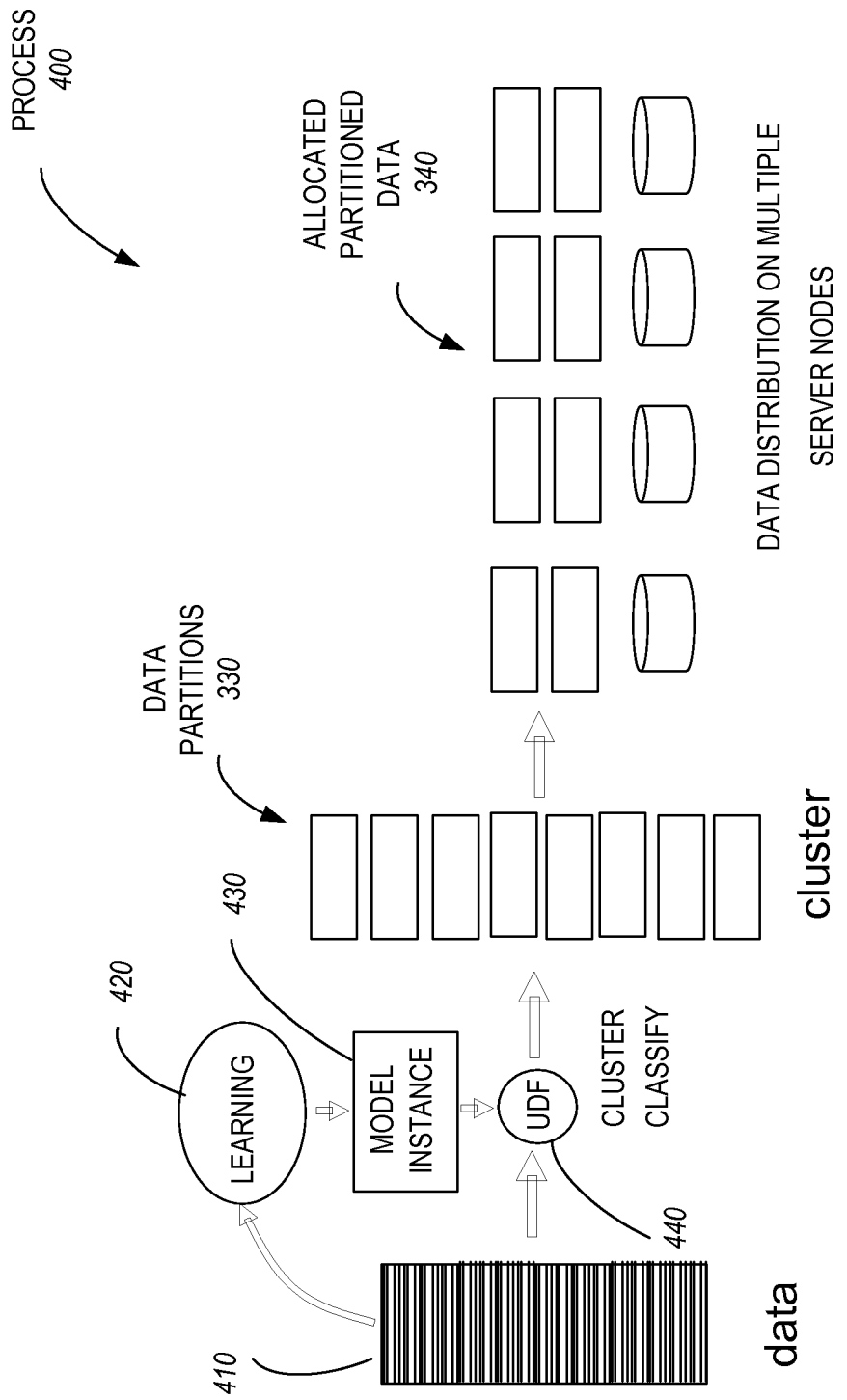
FIG. 4 illustrates a block diagram for a generalized process for parallel processing based on a UDP, according to an embodiment.

FIG. 4 illustrates a block diagram for a generalized process 400 for parallel processing based on a UDP, according to an embodiment. A learning process 420 may be used to analyze original data 410 and formulate a model for a particular application, e.g., river drainage network model 100. A model instance 430 of the model is used to determine computation functions and data partitioning. The computation functions are implemented as database user defined functions 440 (UDFs). UDFs are scheduled to run at the server nodes where the applied data partitions reside. The allocation of UDF's is performed to evenly distribute a processing load on the multiple server nodes while exploiting the parallel processing opportunities for the UDF applications without static and dynamic dependencies. End result of the data partitions 330 being allocated and evenly distributed on the server nodes is allocated partitioned data 340.

The purpose of partitioning data is to have computation functions applied to data partitions in parallel whenever possible; for this two factors are taken into account: the scope of data grouping should match the domain of the computation function, and the order dependency of function applications should be enforced.

A flat data-parallel processing falls in one of the following typical cases:

apply a function to multiple objects, e.g., $f:<x1, \ldots, xn>=<f:x1, \ldots, f:xn>$ apply multiple functions to an object, e.g., $[f1, \ldots, fn]:x=<f1:x, \ldots, fn:x>$.

More generally a computation job is parallelized based on a data dependency graph such as the graph 220, where the above flat-data parallel execution plans are combined in processing data partitions in sequential, parallel or branching. Here the focus is on embarrassing parallel computing without in-task communication but with retrieval of previous computation results through database accessing.

The conventional data partitioning methods expect to group data objects based on existing partition key values, which may not be feasible if there are no key values suitable for the application preexist. The UDP is characterized by partitioning data based on the high-level concept relating to the computation model, which are extracted from the original data and serve as the generated partition keys. In the watershed computation example, partition of data is based on the concept region whose values are not pre-associated with the original river segment data, but generated in the labeling process.

Described below is a process to develop the UDP for a generalized application.

UDP aims at partitioning data objects into regions and distribution of data belonging to different regions over a number K of server nodes.

In the watershed computation, a region is a geographic area in the river drainage network. In other sciences, the notion of region is domain specific; but in general a region means a multidimensional space.

An object is viewed with attributes, or features, $x1, \ldots xn$ as a vector $X=\{x1, \ldots xn\}$ that in general does not contain a partition key thus UDP is used to generate or even learn a label on X, and eventually maps the label to a number in {0, . . . , K} for allocating X to a server node numbered by k (0≤k≤K−1).

Labeling is a mapping, possibly with probabilistic measures.

It is a mapping from a feature space (e.g. medical computer tomography (CT) features, molecular properties features) X={x1, . . . xn} to a label space Y={Y1, . . . Ym} where Yi is a vector in the label space;

A labeling mapping potentially yields a confident ranging over 0 to 1.

The labeling algorithm is used to find the appropriate or best-fit mappings X→Yi for each i.

Allocating is a mapping from the above label space to an integer; e.g., map a label vector with probabilistic measures to a number that represents a server node. This mapping may be made in two steps.

In the first step, a label vector is mapped to a logical partition id called region-hash (e.g. 1-1024) independent of the actual number (e.g. 1-128) of server node.

In the second step that region-hash is mapped to a physical partition id such as a server node number by a hash-map.

The method for generating label-hash can be domain specific. As an example, ignoring the confident measures, a mapping from a multidimensional vector to a unique single value can be done using spatial filing curves that turn a multidimensional vector to an integer, and then such an integer can be hash mapped to a label hash value. Methods taking into account of confidence of labels can also be domain specific, e.g. in computer tomography interpretation.

Figure 5A:
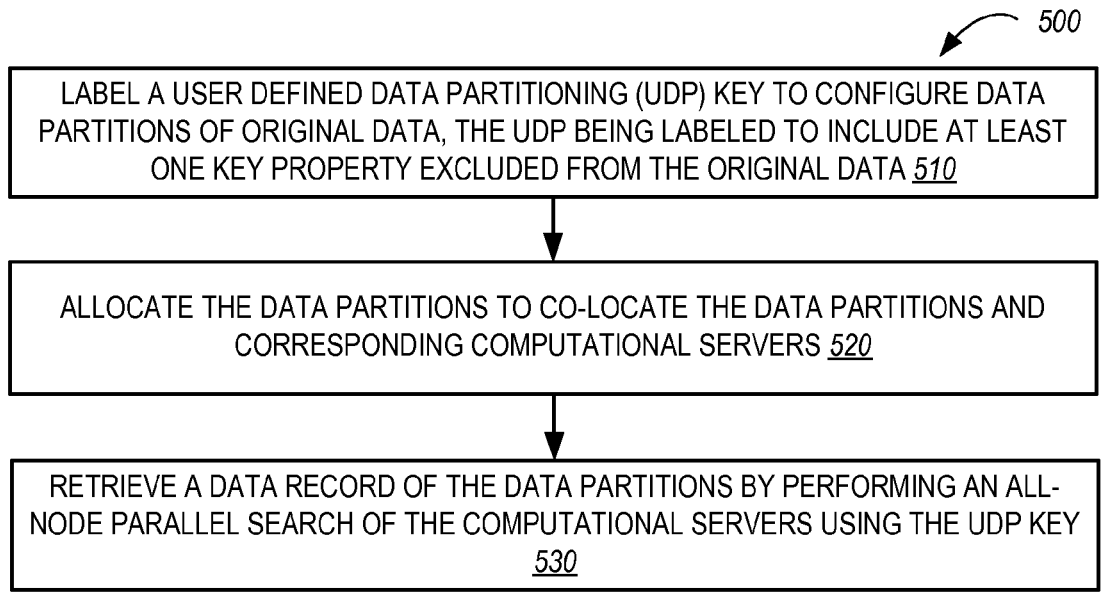
FIG. 5A illustrates a flow chart of a method for generating a UDP, according to an embodiment.

FIG. 5A illustrates a flow chart of a method 500 for generating and subsequent use of a UDP, according to an embodiment. As mentioned earlier, the conventional hash, range and list partitioning methods rely on existing partition key values to group data. For many applications, data is often grouped based on the criteria presented at an aggregate or summarized level, and there are no partition keys that preexist in the original data for such grouping. A UDP, which is characterized by partitioning data based on certain higher-level concepts reflecting the application semantics, addresses this issue. In parallel processing applications using a UDP, partition key values may not present in the original data, but instead they are generated or learnt by a labeling process. In a particular embodiment, the method 500 is used for generating and using a UDP of described with reference to FIGS. 1A, 1B, 2A, 2B, 3A, 3B, 3C, and 4.

At process 510, a user defined data partitioning (UDP) key is labeled to configure data partitions of original data, the UDP being labeled to include at least one key property excluded from the original data. The labeling may be performed by learning from the original data to generate the UDP key. The UDP key is generated in accordance with a computation model that is aware of the data partitions. At process 520, the data partitions are distributed or allocated to co-locate the data partitions and corresponding computational servers. At process 530, a data record of the data partitions is retrieved by performing an all-node parallel search of the computational servers using the UDP key.

Figure 5B:
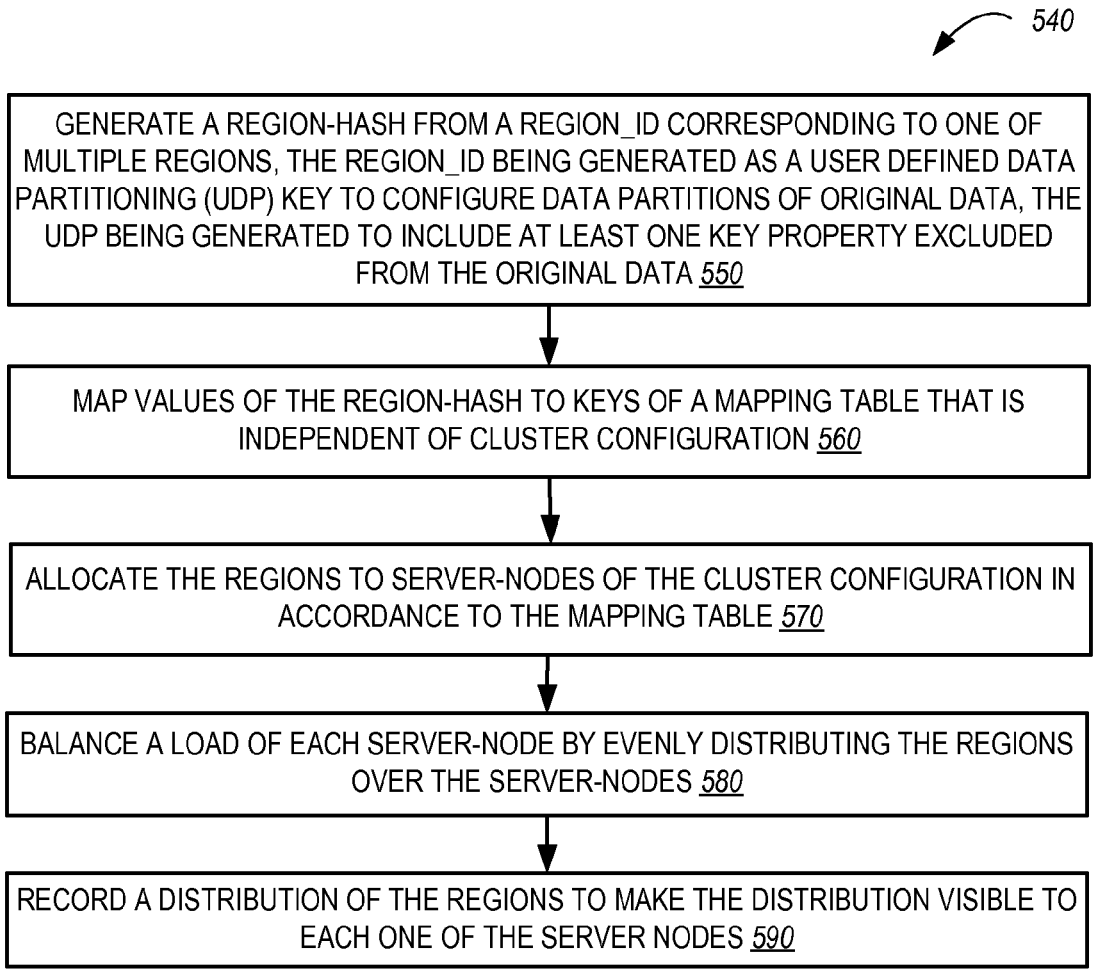
FIG. 5B illustrates a flow chart of a method for allocating data partitions, according to an embodiment.

FIG. 5B illustrates a flow chart of a method 540 for allocating data partitions, according to an embodiment. In a particular embodiment, the method 540 is used for allocating data partitions generated by using a UDP of described with reference to FIGS. 1A, 1B, 2A, 2B, 3A, 3B, 3C, and 4.

At process 550, a region-hash is generated from a region_ID corresponding to one of multiple regions, the region_ID being generated as a user defined data partitioning (UDP) key to configure data partitions of original data, the UDP being generated to include at least one key property excluded from the original data. At process 560, values of the region-hash are mapped to keys of a mapping table that is independent of cluster configuration. At process 570, the regions are allocated to server-nodes of the cluster configuration in accordance to the mapping table. At process 580, a load of each server-node is balanced by evenly distributing the regions over the server-nodes. At process 590, a distribution of the regions is recorded to make the distribution visible to each one of the server nodes.

With reference to the methods 510 and 540, it is understood, that various steps described above may be added, omitted, combined, altered, or performed in different order. For example, processes may be added to 'evenly balance' load of each server. As another example, a learning process may be performed to generate the UDP key.

Implementation Considerations

The UDP technique described herein is applied to the hydro-informatics system for:

converging parallel data management and parallel computing; and, managing data dependency graph based parallel computations.

For performing the watershed computation:

the river segments data are divided into partitions based on the watershed computation model and allocated to multiple servers for parallel processing;

the same function is applied to multiple data partitions (representing geographic regions) with order dependencies (e.g., from upstream regions to downstream regions);

the data processing on one region retrieves and updates its local data, where accessing a small amount of neighborhood information from upstream regions may be required; and data communication is made through database access.

Architecture Based on a Convergent Cluster

Figure 6:
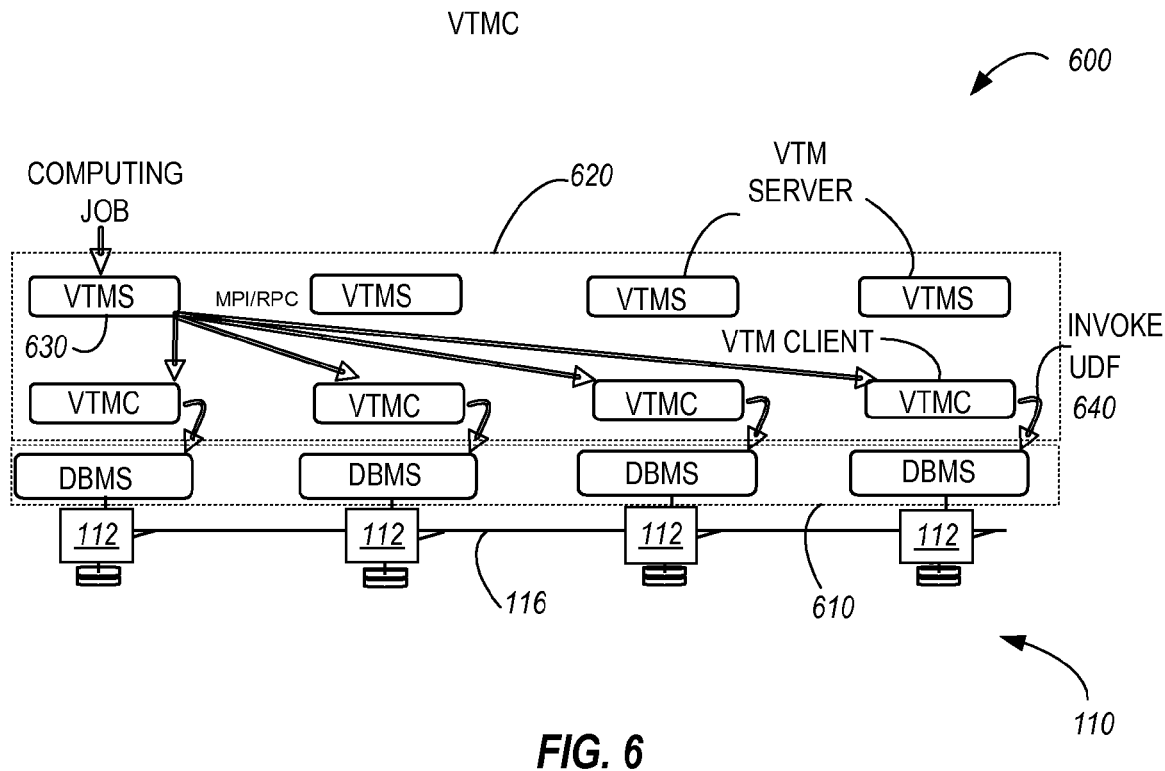
FIG. 6 illustrates a system architecture based on a convergent cluster for implementing UDP based parallel processing, according to an embodiment.

FIG. 6 illustrates a system architecture 600 based on a convergent cluster for implementing UDP based parallel processing, according to an embodiment. The cluster platforms of parallel data management and parallel computing may be converged, for shared resource utilization, for reduced data movement between database and applications, and for mutually optimized performance.

For parallel data management, implementation options may include a selection between using a parallel database or multiple individual databases, with the latter being selected for the watershed application. As described with reference to FIG. 1B, a single cluster of server machines for both parallel data management and parallel computing may be selected for implementation. The cluster of servers 110 may contain N nodes (for e.g., N=4, 16, 128, 256, . . . ) interconnected by high-bandwidth communication network 112. The clustered server nodes 110 may execute individual share-nothing relational DBMS 610; data are partitioned to multiple databases based on their domain specific properties, allowing the data access throughput to increase linearly along with the increase of server nodes. The server nodes 110 form one or more cliques in data accessing, allowing a data partition to be visible to multiple nodes, and a node to access multiple data partitions. This arrangement is desired for simplifying inter-node messaging and for tolerating faults (as described above, the computation on a region may need to retrieve the updated information of the root nodes of its child regions).

The computation functions may be implemented as database user defined functions (UDFs) for co-locating data intensive computation and data management.

While employing multiple server nodes and executing multiple DBMSs, the convergent cluster architecture offers application a single system image transparent to data partitioning and execution parallelization. This may be accomplished by building a Virtual Software Layer (VSL) 620 on top of DBMS 610 that provides Virtual Data Management (VDM) for dealing with data access from multiple underlying databases, and Virtual Task Management (VTM) 630 for handling task partition and scheduling.

In the current design, the VSL 620 resides at each server node, all server nodes are treated equally: every server node holds partitions of data, as well as the meta-data describing data partitioning; has VDM capability as well as VTM 630 capability. The locations of data partitions and function executions are consistent but transparent from applications.

Task Scheduling

The parallel computation opportunities exist statically in processing the geographically independent regions either at the same level or not, and dynamically in processing the regions with all their children regions have been processed. These two kinds of opportunities will be interpreted and realized by the system layer.

The computation functions, e.g., UDFs are made available on all the server nodes. The participating server nodes also know the partition of regions and their locations, the connectivity of regions, particular computation models, UDF settings and default values. Further, each VTM is provided with a UDF invoker 640 and an ODBC connector.

A computation job can be task-partitioned among multiple server nodes to be executed in parallel. Task scheduling is data-driven, based on the locality and geo-dependency of the statically partitioned data. UDFs are scheduled to run at the server nodes where the applied data partitions reside. Local execution results are stored in databases, and communicated through database access. The computation results from multiple server nodes may be assembled if necessary.

In more detail, task scheduling is based on the master-slave architecture. Each server node can act as either master or slave, and can have both of them.

The VTM-master is responsible for scheduling tasks based on the location of data partitions, their processing dependencies, and the execution status. It determines the parallel processing opportunities for the UDF applications without static and dynamic dependencies, send task requests together with parameters to the VTM-slaves where the data to be computed on reside, monitors executions status, re-executes tasks upon failure, etc. Currently, the resembling of local results is handled directly by the VTM-master module.

Upon receipt of task execution requests and parameters from the VTM-master, the VTM-slaves execute their tasks through UDF invokers.

For messaging, the MPI protocol is currently utilized where VTM master and slaves serve as MPI masters and slaves. Although the data from master to slave may include static inputs associated with a new region, processes on different regions pass information through database access.

Embodiments disclosed herein provide a User Defined Data Partitioning (UDP) technique that correlates data partitioning and application semantics. In a convergent cluster platform for data intensive application and data management, UDP based partitioning data over the cluster nodes is a major mechanism for parallel processing. However, the conventional data partitioning methods do not take into account the application level semantics thus may not be able to partition data properly to fit in the computation model. These partitioning methods are primarily used to support flat parallel computing, and based on the existing partition key values, but the criterion of partitioning data could relate to a concept presented at the application level rather than in the original data; should that happen, there would be no appropriate partition keys identifiable. With UDP, partition key values are not expected to pre-exist, but generated or learnt in a labeling process based on certain higher level concept extracted from the original data, which relates to the computation model, and especially the "complex" parallel computing scheme based on data dependency graphs.

The UDP technique supports computation model aware data partitioning and supports to correlate data analysis, machine learning to parallel data management. As applied to a hydro-informatics system, for supporting periodical, near-real-time, data-intensive hydrologic computation on a database cluster, experimental results reveal its performance and efficiency in tightly coupling data partitioning with 'complex' parallel computing in the presence of data processing dependencies.

Figure 7:
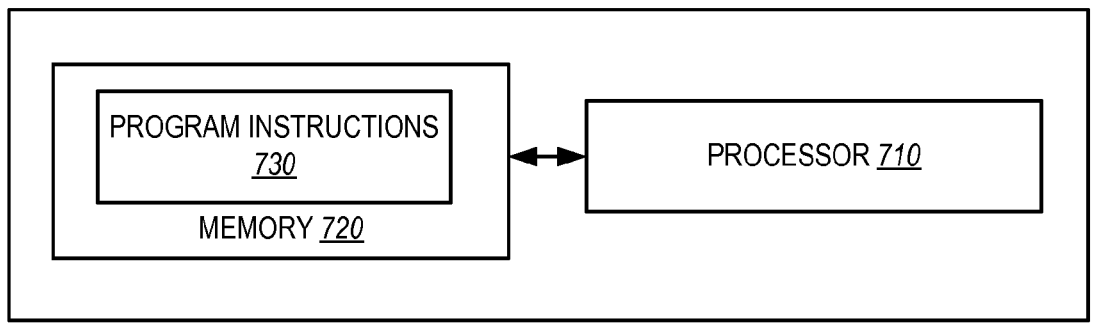
FIG. 7 illustrates a block diagram of a computer system, according to an embodiment.

FIG. 7 illustrates a block diagram of a computer system 700, according to an embodiment. The computer system 700 includes a processor 710 coupled to a memory 720. The memory 720 is operable to store program instructions 730 that are executable by the processor 710 to perform one or more functions. It should be understood that the term "computer system" is intended to encompass any device having a processor that is capable of executing program instructions from a computer-readable medium such as memory devices and storage devices. In a particular embodiment, the various functions, processes, methods 500 and 540, and operations described herein may be implemented using the computer system 700. For example, the river drainage network model 100 and components thereof, e.g., the cluster of servers 110, may be implemented as program instructions 730 using one or more of the computer system 700.

The various functions, processes, methods, and operations performed or executed by the system 700 can be implemented as the program instructions 730 (also referred to as software or simply programs) on computer readable medium that are executable by the processor 710 and various types of computer processors, controllers, microcontrollers, central processing units, microprocessors, digital signal processors, state machines, programmable logic arrays, and the like. In an exemplary, non-depicted embodiment, the computer system 700 may be networked (using wired or wireless networks) with other computer systems.

In various embodiments the program instructions 730 may be implemented in various ways, including procedure-based techniques, component-based techniques, object-oriented techniques, rule-based techniques, among others. The program instructions 730 can be stored on the memory 720 or any computer-readable medium for use by or in connection with any computer-related system or method. A computer-readable medium is an electronic, magnetic, optical, or other physical device or means that can contain or store computer program logic instructions for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, a watershed computation application is described. It is understood that the methods and systems described herein may be applied in all parallel processing applications. The illustrative techniques may be used with any suitable data processing configuration and with any suitable servers, computers, and devices. In the claims, unless otherwise indicated the article "a" is to refer to "one or more than one".

What is claimed is:

1. A computer system for data partitioning, the computer system comprising:
    a memory; and
    a computer processor to:
        generate a user defined data partitioning key to configure data partitions of original data, the user defined data partitioning key generated based upon a computational model applied to the original data, the user defined data partitioning key to include at least one key property of the computational model, the at least one key property is excluded from the original data, and the user defined data partitioning key is generated or learnt from the original data based on an application; and
        allocate the data partitions to co-locate the data partitions and corresponding processing of computations associated with the computational model.

2. The system of claim 1, the computer processor to distribute the data partitions in accordance with the computational model.

3. The system of claim 1, the computer processor to compute the data partitions in accordance with a data dependency graph based parallel processing.

4. The system of claim 1, the computer processor to retrieve a data record of the data partitions by performing an all-node parallel search of computational servers performing the computations.

5. The system of claim 1, the computer processor to retrieve a data record of the data partitions by generating partition indices to perform a query as a two-step search.

6. The system of claim 1, the computer processor to communicate information about the data partitions to each one of a cluster of computational servers performing the computations.

7. The system of claim 1, the computer processor to balance a load level of computational servers performing the computations by evenly distributing the data partitions.

8. The system of claim 1, the computer processor to apply a computation function to data objects included in the data partitions.

9. The system of claim 1, the computer processor to execute an algorithm to generate a label used as the user defined partition key, the algorithm being configured in accordance with the computation model.

10. The system of claim 1, the computer processor to mark rows of a table T for representing membership in a group, the group being accessed by the user defined partition key, the table T including at least a portion of the original data.

11. The system of claim 1, the computer processor to map from a feature space X to a label space Y, the feature space X comprising vectors $x_1$ to $x_n$, n being an integer, the label space Y comprising vectors $y_1$ to $y_m$, m being an integer, $y_i$ being a vector in the label space X.

12. The system of claim 11, the computer processor to include a probability measure in the map.

* * * * *